US008848398B2

(12) United States Patent
Niijima et al.

(10) Patent No.: US 8,848,398 B2
(45) Date of Patent: Sep. 30, 2014

(54) DIRECT CURRENT POWER SUPPLY DEVICE

(75) Inventors: Tetsuya Niijima, Niiza (JP); Hiroyuki Chikashige, Niiza (JP)

(73) Assignee: Sanken Electric Co., Ltd., Niiza-Shi (JP)

( * ) Notice: Subject to any disclaimer, the term of this patent is extended or adjusted under 35 U.S.C. 154(b) by 576 days.

(21) Appl. No.: 13/111,013

(22) Filed: May 19, 2011

(65) Prior Publication Data

US 2011/0292693 A1 Dec. 1, 2011

(30) Foreign Application Priority Data

May 27, 2010 (JP) .................................. 2010-121803

(51) Int. Cl.
*H02M 3/335* (2006.01)

(52) U.S. Cl.
USPC ............................................................ 363/20

(58) Field of Classification Search
USPC .............................. 363/20, 21.01, 95, 97, 131
See application file for complete search history.

(56) References Cited

U.S. PATENT DOCUMENTS

| 5,991,172 | A | 11/1999 | Jovanovic et al. | |
| 7,254,045 | B2 * | 8/2007 | Imamura ....................... | 363/21.1 |
| 2002/0114176 | A1 | 8/2002 | Morita et al. | |
| 2008/0089100 | A1 * | 4/2008 | Park et al. .................. | 363/21.01 |

FOREIGN PATENT DOCUMENTS

| JP | 6-111978 | 4/1994 |
| JP | 8-186981 | 7/1996 |
| JP | 9-117146 | 5/1997 |
| JP | 9-163741 | 6/1997 |
| JP | 11-308857 | 11/1999 |
| JP | 2000-133488 A | 5/2000 |
| JP | 2001-157450 A | 6/2001 |
| JP | 2002-17086 A | 1/2002 |
| JP | 2002-247843 A | 8/2002 |
| JP | 2003-70249 A | 3/2003 |
| JP | 2005-39975 A | 2/2005 |
| JP | 2005-45966 A | 2/2005 |
| JP | 2007-97301 A | 4/2007 |

* cited by examiner

*Primary Examiner* — Adolf Berhane
*Assistant Examiner* — Afework Demisse
(74) *Attorney, Agent, or Firm* — Birch, Stewart, Kolasch & Birch, LLP

(57) ABSTRACT

In a direct-current power supply device that includes a smoothing capacitor C1, which performs a DC/DC converter operation, a transformer T1, a switching element Q1, a diode D2, a smoothing capacitor C2, a reactor L1, which performs a PFC operation, a fast recovery diode D1 and a switching element Q1, when compared with the case of a rated load, the voltage of the smoothing capacitor C1 of a PFC circuit rises at a time when a load is light. Therefore, the following has been required: a capacitor having a sufficient withstanding voltage rating, or an operation of connecting a plurality of capacitors in series or any other operation to secure a voltage-withstanding capability.

A direct-current power supply device 1, in which a switching element Q1 used by a PFC circuit is shared as a switching element Q1 by a DC/DC converter, includes voltage suppression means (switching elements Q2 and Q3 and resistance R2) for supplying electric charge accumulated in a smoothing capacitor C1 to a power supply Vcc of a control circuit CTL1 that controls the switching element Q1 at a time when a load is light in order to suppress a rise in voltage in the smoothing capacitor C1.

8 Claims, 8 Drawing Sheets

US 8,848,398 B2

DIRECT CURRENT POWER SUPPLY DEVICE

BACKGROUND OF THE INVENTION

1. Field of the Invention

The present invention relates to a direct-current power supply device and particularly to a technique of reducing a rise in voltage of a smoothing capacitor of a PFC (Power Factor Correction: Power factor improvement) circuit at a time when a load is light in a direct-current power supply device designed to control a DC/DC converter and the PFC circuit by means of one switching element.

2. Description of the Related Art

A direct-current power supply device, which converts a commercial alternating-current power supply to a direct-current power supply using a rectification smoothing circuit and then converts the direct-current power supply to a desired direct-current voltage using a DC/DC converter to output the direct-current voltage, has been used. When the direct-current power supply is obtained by the rectification smoothing circuit from the commercial alternating-current power supply, current flows through a smoothing capacitor only around a peak of sine-wave alternating-current voltage. Accordingly, a power factor becomes worse; a higher harmonic wave is generated, which badly affects surrounding areas. To solve the above problem, a PFC circuit may be provided in the rectification smoothing circuit. In this case, a switch used by the PFC circuit can be shared as a switching element by the DC/DC converter; the sharing of the switch is effective in making the direct-current power supply device smaller and reducing costs. Those sharing the switching element between the PFC circuit and the DC/DC converter include, for example, the one disclosed in Jpn. Pat. Appln. Laid-Open Publication No. 2002-247843 (Patent Document 1) or U.S. Pat. No. 5,991,172 (Patent Document 2).

CITATION LIST

Patent Document

[Patent Document 1] Jpn. Pat. Appln. Laid-Open Publication No. 2002-247843
[Patent Document 2] U.S. Pat. No. 5,991,172

The above conventional techniques are effective in making devices smaller and reducing costs because the switching elements and controllers used in the PFC circuit and DC/DC converter are put into one. However, it is only output voltage of the DC/DC converter that can be controlled in a stable manner. Therefore, the problem is that when a load of the DC/DC converter is light, terminal voltage of the smoothing capacitor of the PFC circuit rises. FIG. 6 shows a characteristic, with the horizontal axis representing the output voltage (the state of the load) of the DC/DC converter and the vertical axis representing the terminal voltage of the smoothing capacitor of the PFC circuit. It is clear that as the output voltage of the DC/DC converter falls (or turns into a light-load state), the terminal voltage of the smoothing capacitor of the PFC circuit rises.

In general, an electrolytic capacitor is used for the smoothing capacitor with a unique absolute rated voltage; there is a limit to the voltage that can be applied to the smoothing capacitor. The reason why the terminal voltage of the smoothing capacitor of the PFC circuit rises at a time when the load of the DC/DC converter is light has been unclear. Therefore, the following has been required for the smoothing capacitor: a capacitor having a sufficient withstanding voltage rating, or an operation of connecting two or more capacitors in series or any other operation to secure a voltage-withstanding capability. Or alternatively, an overvoltage protection circuit has been provided to protect the capacitor against overvoltage. The measures described above, however, lead to an increase in costs and become a snag in terms of implementation when the device is made smaller.

The inventors of the present invention have found as a result of careful examination that the inefficiency in a process of transferring the energy released from a reactor of the PFC circuit to a secondary side of a transformer at a time when the load is light is a cause of the above problem. That is, when the load is light, the ON pulse width, which is used to switch the switching element ON/OFF, becomes narrower. Therefore, stray capacitance that exists on a primary winding of the transformer, or a capacitor of a snubber circuit that is connected to the primary winding of the transformer to absorb a surge voltage, is not fully charged. As a result, the voltage of the transformer is lowered. Thus, the energy released form the reactor of the PFC circuit cannot be transferred to the secondary side of the transformer in an efficient manner. The phenomenon will be described with reference to FIGS. 7 and 8.

FIG. 7 shows the circuit configuration of a direct-current power supply device 100 of a conventional technique, which is so formed as to control a DC/DC converter and a PFC circuit with one switching element. FIG. 8 shows the operational waveform of each portion to explain an operation of the direct-current power supply device 100 when a load is light. Since the load is light, the direct-current power supply device 100 oscillates intermittently. What is shown is the rising terminal voltage of a smoothing capacitor C1 of the PFC circuit.

As shown in FIG. 7, the direct-current power supply device 100 includes the smoothing capacitor C1, which performs a DC/DC converter operation; a transformer T1; a switching element Q1; a diode D2; a smoothing capacitor C2; a reactor L1, which performs a PFC operation; a fast recovery diode D1, which serves as a backflow preventing diode; and a switching element Q1. In this case, the switching element Q1 is shared by a DC/DC converter section and a PFC section. The DC/DC converter section works as a flyback converter. The voltage polarity of the transformer T1 is set as indicated by ● in the diagram so as to work as a flyback converter.

As the switching element Q1 is turned ON/OFF, a change in voltage of a high frequency wave occurs at a tap section where two windings N1$a$ (first primary winding) and N1$b$ (second primary winding) of the primary winding N1 of the transformer T1 are connected in response to the ON/OFF operation of the switching element Q1. As the voltage changes, high frequency current flows through the reactor L1. The amplitude of the current varies according to the voltage amplitude of a commercial alternating-current power supply Vs. Therefore, the PFC operation with improved power factors is achieved.

The circuit configuration of the direct-current power supply device 100 will be described with reference to FIG. 7. To a rectification circuit RC1 where diodes are so connected to form a bridge, a commercial alternating-current power supply Vs is connected. Between a positive electrode-side output terminal and negative electrode-side output terminal of the rectification circuit RC1, a bypass capacitor C3, whose capacitance is smaller than that of the smoothing capacitor C1, is connected. To a connection point where the positive electrode-side output terminal of the rectification circuit RC1 and one terminal of the bypass capacitor C3 are connected, one terminal of the reactor L1 is connected. To the other terminal of the reactor L1, an anode terminal of the fast recovery diode D1 is connected. A cathode terminal of the fast recovery diode D1 is connected to the tap section of the primary winding N1 of the transformer T1. The primary winding N1 of the transformer T1 is made up of two windings N1a (first primary winding) and N1b (second primary winding). A connection point where the other terminal of the first primary winding N1a and one terminal (at the side indicated by ● in the diagram) of the second primary winding N1b are connected together is the tap section described above. One terminal (at the side indicated by ● in the diagram) of the first primary winding N1a is connected to one terminal (at the positive electrode side) of the smoothing capacitor C1. The other terminal (at the negative electrode side) of the smoothing capacitor C1 is connected to a connection point where the negative electrode-side output terminal of the rectification circuit RC1 and the other terminal of the bypass capacitor C3 are connected. The other terminal of the second primary winding N1b is connected to a drain terminal of the switching element Q1. A source terminal of the switching element Q1 is connected to a connection point where the negative electrode output terminal of the rectification circuit RC1, the other terminal of the bypass capacitor C3 and the other terminal of the smoothing capacitor C1 are connected together.

The other terminal of the secondary winding N2 of the transformer T1 is connected to an anode terminal of the diode D2. A cathode terminal of the diode D2 is connected to one terminal (at the positive electrode side) of the smoothing capacitor C2. One terminal (at the side indicated by ● in the diagram) of the secondary winding N2 of the transformer T1 is connected to the other terminal (at the negative electrode side) of the smoothing capacitor C2. One terminal and the other terminal of the smoothing capacitor C2 serve as a positive electrode-side output terminal A and negative electrode-side output terminal B of the direct-current power supply device 100, respectively. The voltage between the positive electrode-side output terminal A and negative electrode-side output terminal B of the direct-current power supply device 100 is input to a control circuit CTL5, which outputs a pulse signal to a gate terminal of the switching element Q1 to turn the switching element Q1 ON/OFF so that a target voltage is obtained.

The waveforms shown in FIG. 8 represent, from top to bottom, positive electrode-side output voltage Vin (=voltage Vc3 of the bypass capacitor C3) of the rectification circuit RC1, drain-to-source voltage Vds of the switching element Q1, voltage Vc1 of the smoothing capacitor C1, current IL1 of the reactor L1, current IC1 of the smoothing capacitor C1, drain current IQ1 of the switching element Q1, current ID2 of the diode D2, and output voltage Vo of the direct-current power supply device 100 (=voltage VC2 of the smoothing capacitor C2), with t1 to t18 at the bottom representing time.

(Until t0)

The positive electrode-side output voltage Vin (=voltage Vc3 of the bypass capacitor C3) of the rectification circuit RC1 is substantially at a constant level, as the DC/DC converter consumes less power because the load is light. At time t0, the output voltage Vo goes down to a switching operation restart voltage, which is lower than the rated voltage. The control circuit CTL 5 outputs a gate signal to the switching element Q1 to prompt ON/OFF control.

(t0 to t1)

After the switching element Q1 is turned on at time t0, the voltage waveform of the drain-to-source voltage Vds of the switching element Q1 becomes substantially 0V as shown in FIG. 8, and the discharging of electricity of the smoothing capacitor C1 takes place through the first and second primary windings N1a and N1b of the transformer T1 (The discharge current is IC1). Accordingly, the voltage VC1 of the smoothing capacitor C1 drops over time t0 to t1. From t0 to t1, the current IL1 of the reactor L1 flows through the second primary winding N1b of the transformer T1 and the switching element Q1, rising from 0 A. At this time, the drain current IQ1 of the switching element Q1 is a flow of current that is the sum of the discharge current IC1 of the smoothing capacitor C1 and the current IL1 from the reactor L1.

(t1 to t2)

From time t1 to t2, after the switching element Q1 is turned off by OFF signal, the magnetic energy accumulated in the reactor L1 charges the smoothing capacitor C1 via the first primary winding N1a of the transformer T1. At this time, because of the voltage applied to the first primary winding N1a, the voltage of the secondary winding N2 occurs in proportion to the turns ratio, but does not go above the output voltage Vo (=the voltage VC2 of the smoothing capacitor C2). Therefore, the diode D2 remains off. Thus, the secondary-side smoothing capacitor C2 is not charged with the voltage of the secondary winding N2.

(t2 to t6)

Then, a similar operation takes place from time t2 to t6. At this time, the charging and discharging of the voltage of the smoothing capacitor C1 is repeatedly performed, and the voltage of the smoothing capacitor C1 gradually rises as shown in FIG. 8. The charging and discharging of the stray capacitance between the windings of the transformer T1 (or a capacitor C5 of the snubber circuit (the stray capacitance is not shown in the diagram; the snubber circuit is shown briefly with the capacitor C5 and resistance R1)) is also repeatedly performed, and the voltage thereof also gradually rises. However, the stray capacitance (or the capacitor C5 of the snubber circuit) between the windings of the transformer T1 discharges more easily than the smoothing capacitor C1 because the stray capacitance and the windings of the transformer T1 are connected in parallel. Therefore, the voltage of the stray capacitance (or the capacitor C5 of the snubber circuit) between the windings of the transformer T1 rises more slowly than the voltage of the smoothing capacitor C1. As the load becomes lighter, an ON period of the switching element Q1 and a charging period of the stray capacitance (or the capacitor C5 of the snubber circuit) between the windings of the transformer T1 become shorter. Thus, when the load is light, it is difficult to charge the stray capacitance (or the capacitor C5 of the snubber circuit) between the windings of the transformer T1. However, the stray capacitance discharges easily. As the load becomes lighter, the above slowdown trends to intensify because the pulse width becomes narrower during the charging process. As a result, it takes more time for the secondary voltage of the transformer T1 to rise to the output voltage Vo after an ON pulse has been supplied to the gate of the switching element Q1 from the control circuit CTL5. Meanwhile, the voltage of the smoothing capacitor C1 goes higher.

(t7 to t9)

At time t8, a middle point between time T7 and t9, current starts to flow through the diode D2, meaning that at time t8, the voltage of the stray capacitance (or the capacitor C5 of the snubber circuit) between the windings of the transformer T1 is being charged, and that the voltage that occurs at the secondary winding N2 has risen to voltage VC2 where the smoothing capacitor 2 can be charged. With the voltage that occurs at the secondary winding N2 of the transformer T1, the smoothing capacitor C2 is being charged via the diode D2 during the period of time t8 to t9. Incidentally, from time t0 to t8, the smoothing capacitor C2 is not charged by the secondary winding N2 of the transformer T1, and the output voltage Vo (voltage VC2 of the smoothing capacitor C2) continues to fall.

(t9 to t10)

After the switching element Q1 is turned on at time t9, the voltage waveform of the drain-to-source voltage Vds of the switching element Q1 becomes substantially 0V as shown in FIG. 8. The voltage VC1 of the smoothing capacitor C1 discharges via the first and second primary windings N1$a$ and N1$b$ of the transformer T1 (the discharge current is IC1), and therefore falls over time t9 to t10. From time t9 to t10, the current IL1 of the reactor L1 flows through the second primary winding N1$b$ of the transformer T1 and the switching element Q1, rising from 0 A. At this time, the drain current IQ1 of the switching element Q1 is a flow of current that is the sum of the discharge current IC1 of the smoothing capacitor C1 and the current IL1 from the reactor L1.

(t10 to t11)

At time t10, after the switching element Q1 is turned off by OFF signal, the magnetic energy accumulated in the reactor L1 charges the smoothing capacitor C1 via the first primary winding N1$a$ of the transformer T1. At this time, because of the voltage applied to the first primary winding N1$a$, the voltage of the secondary winding N2 occurs in proportion to the turns ratio. At this time, the voltage of the secondary winding N2 has already risen to voltage VC2. Therefore, the diode D2 is turned on and, from time t10 to t11, the smoothing capacitor C2 is charged with the voltage of the secondary winding N2.

(t11 to t15)

Then, a similar operation takes place from time t11 to t15. At this time, the voltage of the smoothing capacitor C1 changes as the charging and discharging of the smoothing capacitor C1 is repeatedly performed. However, when compared with the situation between time t0 and t8, the amount of charge becomes smaller, and the amount of discharge larger, because energy has been transferred to the secondary side of the transformer T1. Therefore, the voltage of the smoothing capacitor C1 gradually decreases as shown in FIG. 8. The voltage VC2 (=output voltage Vo) of the smoothing capacitor C2 gradually rises as the smoothing capacitor C2 is charged with the secondary voltage of the transformer T1. During the above period of time t8 to t15, the magnetic energy released from the reactor of the PFC circuit is transferred to the secondary side of the transformer T1.

(t15 to t16)

After the output voltage Vo rises to a target rated voltage at time t15, the control circuit CTL5 detects the output voltage Vo reaching the target rated voltage and outputs an OFF signal to the switching element Q1. In response, the switching element Q1 remains in a halting state until time t16. At this time, the voltage of the smoothing capacitor C1 has risen above the voltage of time t0. Since there is no circuit for discharging electric charge from the smoothing capacitor C1, the voltage VC1 is substantially kept constant. Meanwhile, the electric charge of the stray capacitance (or the capacitor C5 of the snubber circuit) between the windings of the transformer T1 is discharged through the windings of the transformer T1. Therefore, like the above-described situation between time t0 to t8, even if the switching of the switching element Q1 restarts, the voltage of the secondary winding N2 of the transformer T1 does not rise immediately.

(t16 to t17)

Then, at time t16, the output voltage Vo drops to a switching operation restart voltage, which is detected by the control circuit CTL5. The control circuit CTL5 outputs a gate signal, as in the case of time t0, to the switching element Q1 to prompt ON/OFF control. As a result, the switching operation starts. However, from time t15 to t16, the electric charge of the stray capacitance (or the capacitor C5 of the snubber circuit) between the windings of the transformer T1 has been discharged. Therefore, until t17, for the same reason as the above situation between time t0 and t8, the smoothing capacitor C2 is not charged with the voltage that occurs at the secondary winding N2 of the transformer T1. If the period of time t16 to t17 is almost equal to the period of time t0 to t8, the voltage of the smoothing capacitor C1 rises from a starting point at time t16 by an amount substantially equivalent to the rise in voltage between time t0 to t8. Therefore, the voltage of the smoothing capacitor C1 goes higher than that at time t8.

(t17 to t18)

At time t17, current starts to flow through the diode D2, meaning that as in the case of time t8, the voltage of the stray capacitance (or the capacitor C5 of the snubber circuit) between the windings of the transformer T1 is being charged, and that the voltage that occurs at the secondary winding N2 has risen to voltage VC2 where the smoothing capacitor 2 can be charged. Therefore, during the period of time t17 to t18, a similar operation to that during the above period of t8 to t15 takes place. When the switching operation stops at time t18, the voltage of the smoothing capacitor C1 goes higher than that at time t16 as in the case where the voltage of the smoothing capacitor C1 goes higher at time t15 than that at time to.

(t18 and Thereafter)

After time t18, a similar operation is repeatedly performed, and the voltage of the smoothing capacitor C1 rises. However, after the magnetic energy released from the reactor L1 and the energy output from the secondary side of the transformer T1 rise and are equally matched, the magnetic energy from the reactor L1 and the energy from the secondary side of the transformer T1 become balanced, and the voltage of the smoothing capacitor C1 stops rising. In this manner, the output voltage Vo is controlled by the control circuit CTL5 and kept at the rated voltage. However, the voltage of the smoothing capacitor C1 is not controlled by the control circuit CTL5 and goes higher than that at the start of the switching operation.

As described above, the voltage of the smoothing capacitor C1 is unstable, and there is a fear that the voltage of the smoothing capacitor C1 could rise above the withstanding voltage of the capacitor at a time when the load is light. Therefore, according to a conventional technique, the following has been required: a capacitor having a sufficient withstanding voltage rating, or an operation of connecting two or more capacitors in series or any other operation to secure a voltage-withstanding capability. Or alternatively, an overvoltage protection circuit has been provided to protect the capacitor against overvoltage. The measures described above, however, lead to an increase in costs and become a snag in terms of implementation when the device is made smaller.

SUMMARY OF THE INVENTION

The object of the present invention is to solve the problems of the conventional techniques in view of the above problems and to provide a direct-current power supply device, in which a switch used by a PFC circuit is shared as a switching element by a DC/DC converter and which prevents terminal voltage of a smoothing capacitor of the PFC circuit from rising at a time when the DC/DC converter is a light load.

As for a direct-current device of the present invention, a direct-current power supply device, which converts energy obtained from an alternating-current power supply into direct-current energy, includes: a rectifier that converts alternating-current voltage of the alternating-current power supply into direct-current voltage; a transformer that includes a primary winding, which includes a tap at a connection point where a first primary winding and a second primary winding are connected, and a secondary winding; a primary-side smoothing capacitor whose positive electrode-side terminal is connected to a terminal at a side opposite to the tap of the first primary winding and whose negative electrode-side terminal is connected to a negative electrode-side output terminal of the rectifier; a first switching element whose drain and source terminals are connected between the negative electrode-side output terminal of the rectifier and a terminal at a side opposite to the tap of the second primary winding; a reactor and backflow preventing diode that are connected in series between a positive electrode-side output terminal of the rectifier and the tap of the transformer; a direct-current smoothing circuit that includes a rectifying diode, which is connected to the secondary winding of the transformer, and a secondary-side smoothing capacitor; and discharging means for detecting a light-load state of an output and discharging electric charge of the primary-side smoothing capacitor in a way that suppresses an increase in voltage of the primary-side smoothing capacitor.

Moreover, in the direct-current power supply device of the present invention, the discharging means is so formed that the electric charge of the primary-side smoothing capacitor is supplied to power supply of a control circuit that performs ON/OFF control of the first switching element.

Moreover, in the direct-current power supply device of the present invention, the discharging means includes: a second switching element whose drain and source terminals are connected between a power supply terminal of the control circuit and a connection point where the first primary winding and the positive electrode-side terminal of the primary-side smoothing capacitor are connected; resistance that is connected between drain and gate terminals of the second switching element; a third switching element whose drain and source terminals are connected between the gate terminal of the second switching element and the negative electrode-side output terminal of the rectifier; and a control circuit that outputs an ON/OFF signal to a gate terminal of the third switching element, wherein the control circuit is so formed as to detect a decrease in power supply voltage of the control circuit and output, when the decrease in power supply voltage is detected, an OFF signal to the third switching element.

Moreover, as for a direct-current power supply device of the present invention, the direct-current power supply device, which converts energy obtained from an alternating-current power supply into direct-current energy, includes: a rectifier that converts alternating-current voltage of the alternating-current power supply into direct-current voltage; a transformer that includes a primary winding, which includes a tap at a connection point where a first primary winding and a second primary winding are connected, and a secondary winding; a primary-side smoothing capacitor whose positive electrode-side terminal is connected to a terminal at a side opposite to the tap of the first primary winding and whose negative electrode-side terminal is connected to a negative electrode-side output terminal of the rectifier; a first switching element whose drain and source terminals are connected between the negative electrode-side output terminal of the rectifier and a terminal at a side opposite to the tap of the second primary winding; a reactor and backflow preventing diode that are connected in series between a positive electrode-side output terminal of the rectifier and the tap of the transformer; a direct-current smoothing circuit that includes a rectifying diode, which is connected to the secondary winding of the transformer, and a secondary-side smoothing capacitor; and electromagnetic energy supplying means for detecting a light-load state of an output and supplying part of electromagnetic energy of the reactor to a power supply of a control circuit, which performs ON/OFF control of the first switching element, via the second primary winding.

Moreover, in the direct-current power supply device of the present invention, the electromagnetic energy supplying means includes: a second switching element whose drain and source terminals are connected between a power supply terminal of the control circuit and a connection point where the second primary winding and the drain terminal of the first switching element are connected; resistance that is connected between drain and gate terminals of the second switching element; a third switching element whose drain and source terminals are connected between the gate terminal of the second switching element and the negative electrode-side output terminal of the rectifier; and a control circuit that outputs an ON/OFF signal to a gate terminal of the third switching element, wherein the control circuit is so formed as to detect a decrease in power supply voltage of the control circuit and output, when the decrease in power supply voltage is detected, an OFF signal to the third switching element.

Moreover, as for a direct-current power supply device of the present invention, the direct-current power supply device, which converts energy obtained from an alternating-current power supply into direct-current energy, includes: a rectifier that converts alternating-current voltage of the alternating-current power supply into direct-current voltage; a transformer that includes a primary winding, which includes a tap at a connection point where a first primary winding and a second primary winding are connected, and a secondary winding; a primary-side smoothing capacitor whose positive electrode-side terminal is connected to a terminal at a side opposite to the tap of the first primary winding and whose negative electrode-side terminal is connected to a negative electrode-side output terminal of the rectifier; a first switching element whose drain and source terminals are connected between the negative electrode-side output terminal of the rectifier and a terminal at a side opposite to the tap of the second primary winding; a reactor and backflow preventing diode that are connected in series between a positive electrode-side output terminal of the rectifier and the tap of the transformer; a direct-current smoothing circuit that includes a rectifying diode, which is connected to the secondary winding of the transformer, and a secondary-side smoothing capacitor; and electromagnetic energy supplying means for supplying part of electromagnetic energy of the reactor to a power supply of a control circuit, which performs ON/OFF control of the first switching element, via a diode using an auxiliary winding provided in the reactor.

Moreover, in the direct-current power supply device of the present invention, the electromagnetic energy supplying means is so formed that: the auxiliary winding of the reactor and the diode are connected in series between the negative electrode-side output terminal of the rectifier and the power supply of the control circuit; and current flows from the auxiliary winding to the power supply of the control circuit via the diode as the power supply voltage of the control circuit decreases.

Moreover, as for a direct-current power supply device of the present invention, the direct-current power supply device, which converts energy obtained from an alternating-current power supply into direct-current energy, includes: a rectifier that converts alternating-current voltage of the alternating-current power supply into direct-current voltage; a transformer that includes a primary winding, which includes a tap at a connection point where a first primary winding and a second primary winding are connected, and a secondary winding; a primary-side smoothing capacitor whose positive electrode-side terminal is connected to a terminal at a side opposite to the tap of the first primary winding and whose negative electrode-side terminal is connected to a negative electrode-side output terminal of the rectifier; a first switching element whose drain and source terminals are connected between the negative electrode-side output terminal of the rectifier and a terminal at a side opposite to the tap of the second primary winding; a reactor and backflow preventing diode that are connected in series between a positive electrode-side output terminal of the rectifier and the tap of the transformer; a direct-current smoothing circuit that includes a rectifying diode, which is connected to the secondary winding of the transformer, and a secondary-side smoothing capacitor; a control circuit that outputs an ON/OFF signal to the first switching element to control output voltage so that the output voltage becomes predetermined voltage; and an output voltage detection circuit that increases detection voltage relative to the same output voltage and outputs a feedback signal to the control circuit at a time when a load is light, wherein an operation takes place in a way that lowers the output voltage when the load is light.

Moreover, as for a direct-current power supply device of the present invention, the direct-current power supply device, in which a switch used by a PFC circuit is shared as a switching element by a DC/DC converter, includes voltage suppression means for suppressing a rise in voltage of a primary-side smoothing capacitor of the PFC circuit at a time when a load is light.

Moreover, as for a direct-current power supply device of the present invention, the direct-current power supply device, in which a switch used by a PFC circuit is shared as a switching element by a DC/DC converter, includes voltage suppression means for supplying electric charge accumulated in a primary-side smoothing capacitor to a power supply of a control circuit that controls the switching element at a time when a load is light in order to suppress a rise in voltage in the primary-side smoothing capacitor.

Moreover, as for a direct-current power supply device of the present invention, the direct-current power supply device, in which a switch used by a PFC circuit is shared as a switching element by a DC/DC converter, includes voltage suppression means for also supplying magnetic energy released from a reactor of the PFC circuit to a power supply of a control circuit that controls the switching element via a second winding of a primary winding of a transformer at a time when a load is light in order to suppress an amount of charge of a primary-side smoothing capacitor.

Moreover, as for a direct-current power supply device of the present invention, the direct-current power supply device, in which a switch used by a PFC circuit is shared as a switching element by a DC/DC converter, includes voltage suppression means for supplying, with a main winding and auxiliary winding provided in a reactor of the PFC circuit, magnetic energy of the reactor to a power supply of a control circuit via a diode from the auxiliary winding after power supply voltage of the control circuit that controls the switching element at a time when a load is light falls.

Moreover, as for a direct-current power supply device of the present invention, the direct-current power supply device, in which a switch used by a PFC circuit is shared as a switching element by a DC/DC converter, includes voltage suppression means for controlling the DC/DC converter in a way that lowers output voltage at a time when a load is light in order to suppress an amount of charge of a primary-side smoothing capacitor.

According to the present invention, the direct-current power supply device, in which the switch used by the PFC circuit is shared as a switching element by the DC/DC converter, can prevent the terminal voltage of the smoothing capacitor of the PFC circuit from rising at a time when the DC/DC converter is a light load.

DETAILED DESCRIPTION OF THE PREFERRED EMBODIMENTS

The following describes embodiments of the present invention in a concrete way with reference to the accompanying drawings. A direct-current power supply device illustrated in an embodiment of the present invention is a direct-current power supply device in which a switch used by a PFC circuit is shared as a switching element by a DC/DC converter, including voltage suppression means for suppressing an increase in voltage of a smoothing capacitor of the PFC circuit at a time when a load is light.

Figure 1:
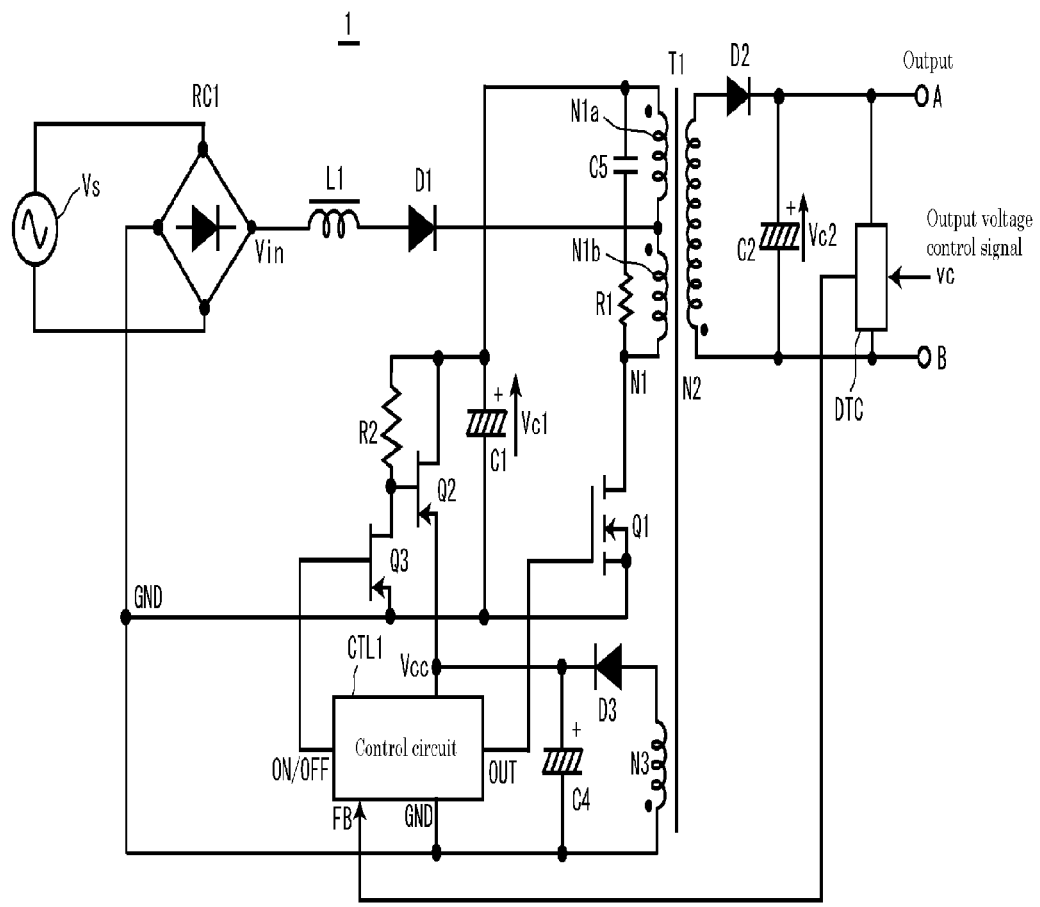
FIG. 1 is a diagram showing the circuit configuration of a direct-current power supply device 1 according to a first embodiment of the present invention.

A direct-current power supply device 1 of a first embodiment shown in FIG. 1 is one that, as voltage suppression means, suppresses a rise in voltage of the smoothing capacitor C1 by supplying electric charge accumulated in the smoothing capacitor C1 to power supply of the control circuit CTL1 at a time when a load is light.

Figure 3:
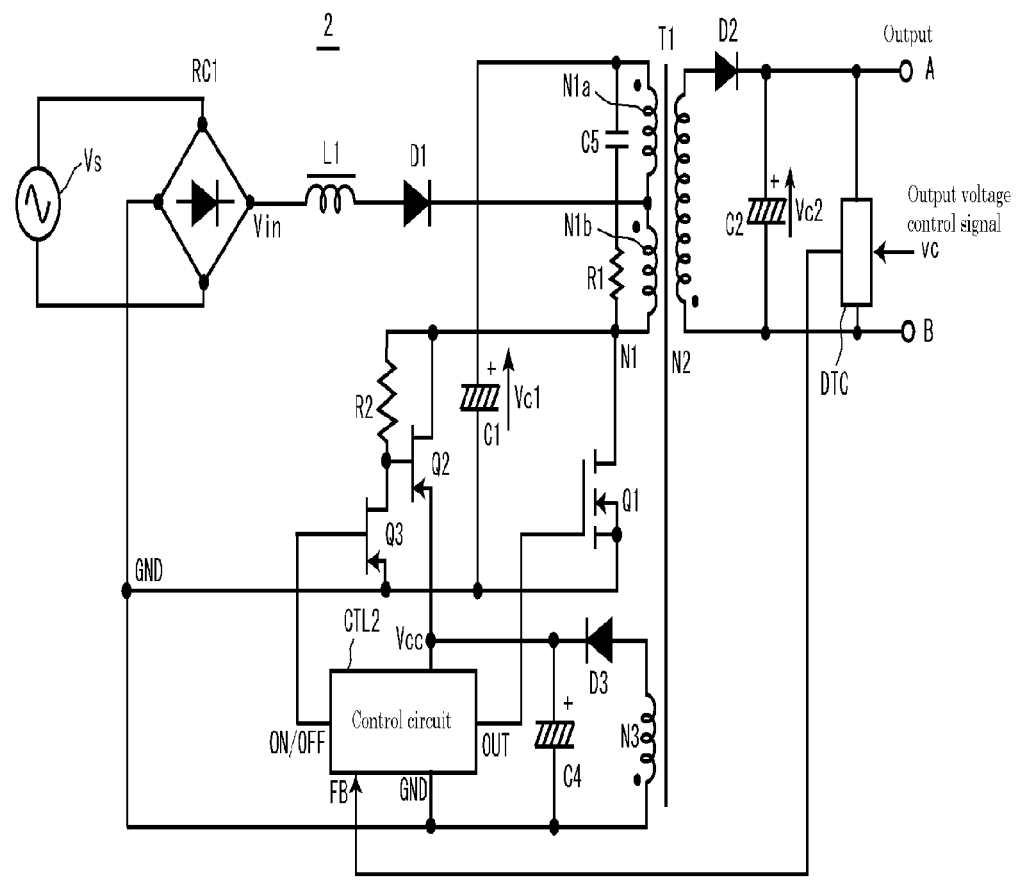
FIG. 3 is a diagram showing the circuit configuration of a direct-current power supply device 2 according to the second embodiment of the present invention.

A direct-current power supply device 2 of a second embodiment shown in FIG. 3 is one that, as voltage suppression means, suppresses an amount of charge of a smoothing capacitor C1 by also supplying magnetic energy released from a reactor L1 of a PFC circuit to power supply of a control circuit CTL2 via the other winding of a primary winding of a transformer T1 at a time when a load is light.

Figure 4:
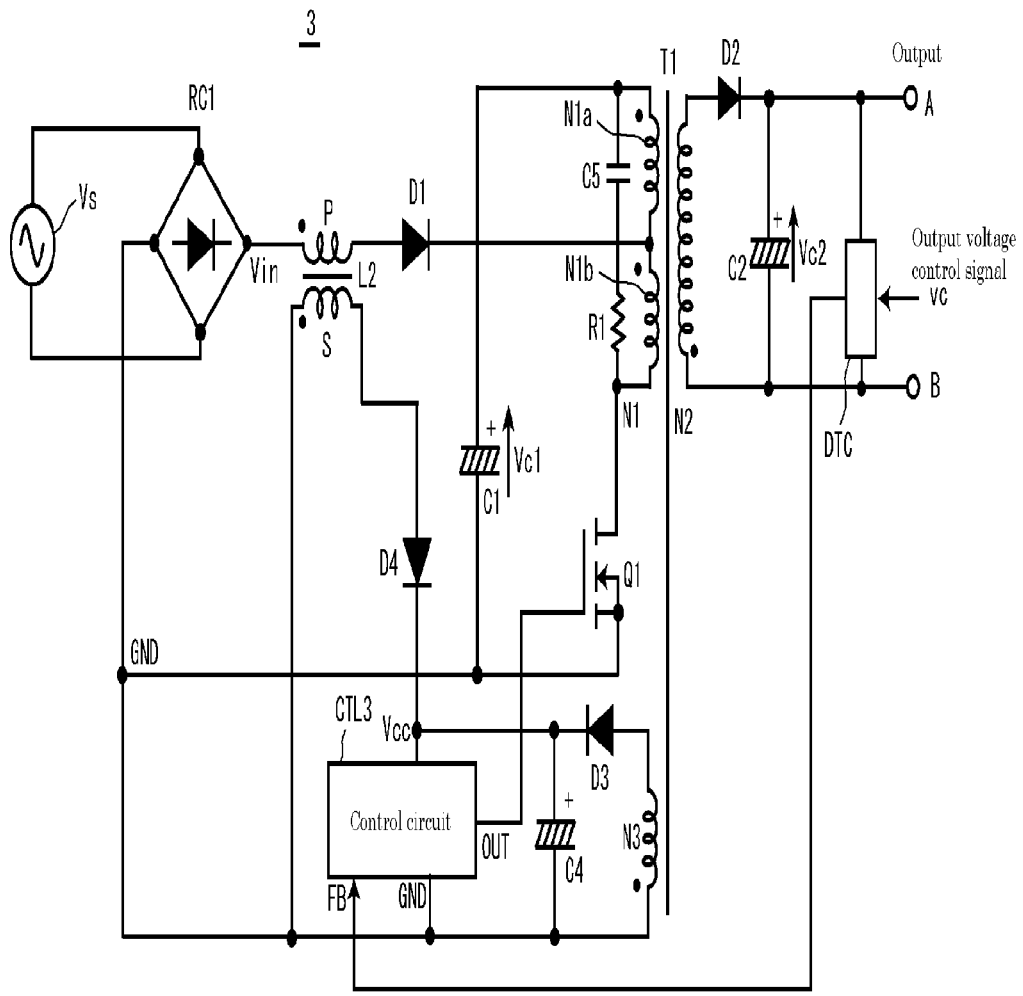
FIG. 4 is a diagram showing the circuit configuration of a direct-current power supply device 3 according to the third embodiment of the present invention.

A direct-current power supply device 3 of a third embodiment shown in FIG. 4 is one in which a main winding P and an auxiliary winding S are provided, as voltage suppression means, in a reactor L2 of a PFC circuit. The main winding P is used in the same way as a reactor L1; as the power supply voltage of a control circuit CTL3 falls at a time when a load is light, magnetic energy of the reactor L2 is supplied to power supply of the control circuit CTL3 from the auxiliary winding S via a diode D4.

Figure 5:
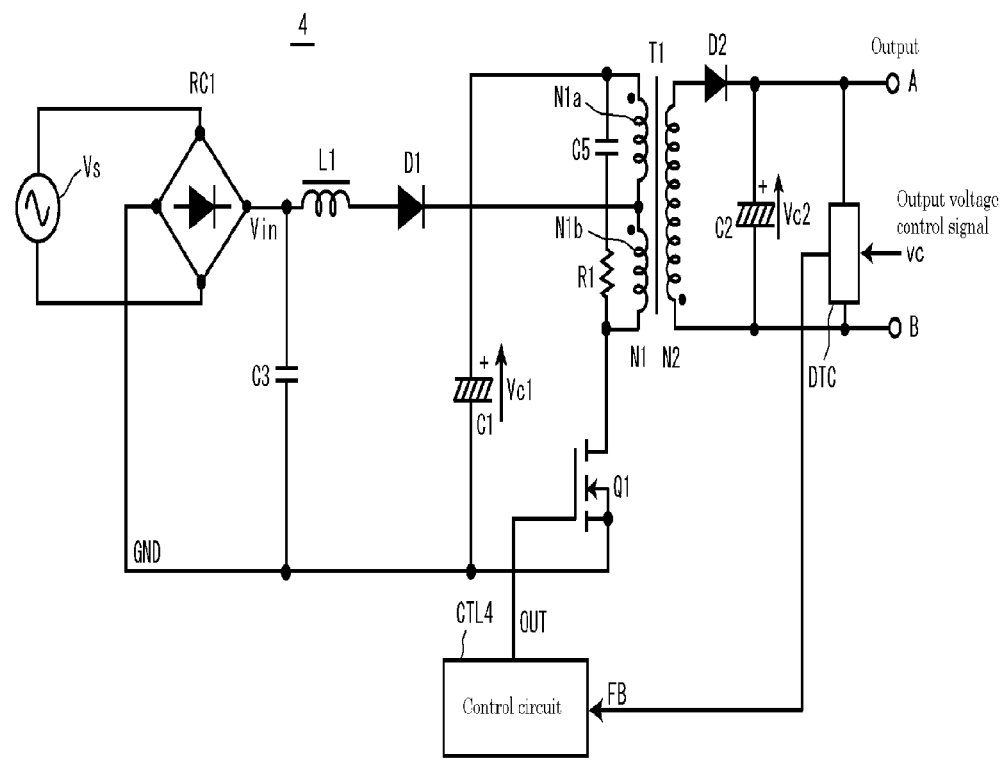
FIG. 5 is a diagram showing the circuit configuration of a direct-current power supply device 4 according to the fourth embodiment of the present invention.
Figure 6:
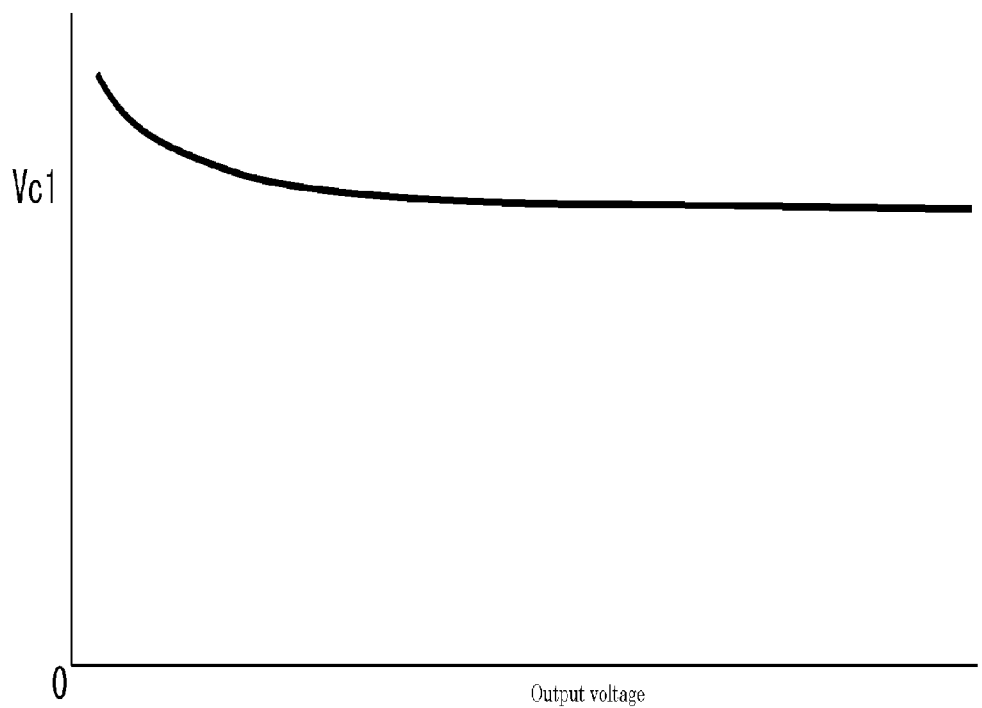
FIG. 6 is a diagram showing a voltage characteristic of a smoothing capacitor of a direct-current power supply device 100 of a conventional technique.
Figure 8:
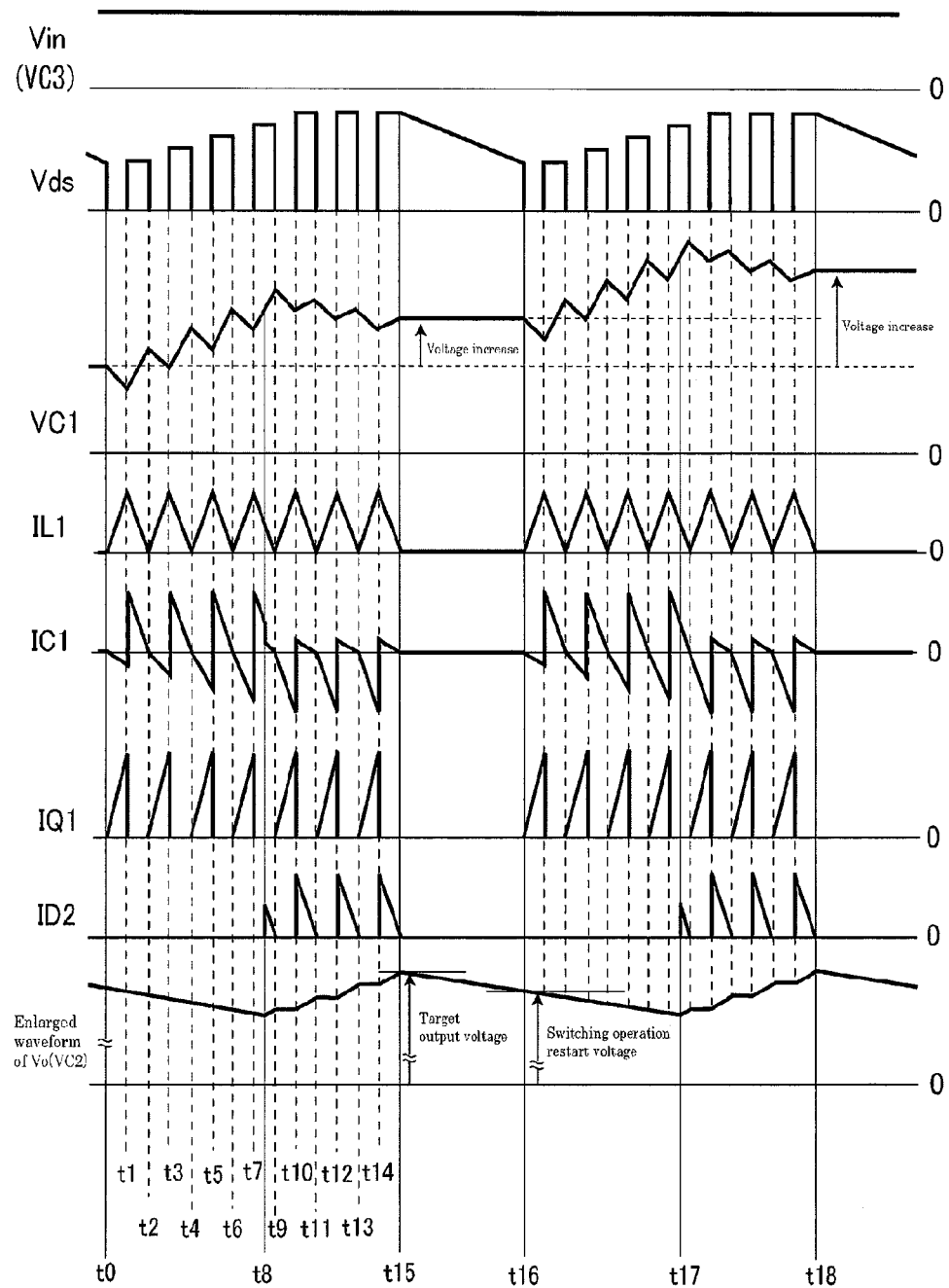
FIG. 8 is a diagram showing the operational waveform of each section of the direct-current power supply device 100 of a conventional technique.

A direct-current power supply device 4 of a fourth embodiment shown in FIG. 5 is one that controls a DC/DC converter in such a way that output voltage decreases at a time when a load is light, thereby shortening the period of time t0 to t8 (the period of time t16 to t17) shown in FIG. 8 and curbing an amount of charge of a smoothing capacitor C1.

(First Embodiment)

Figure 7:
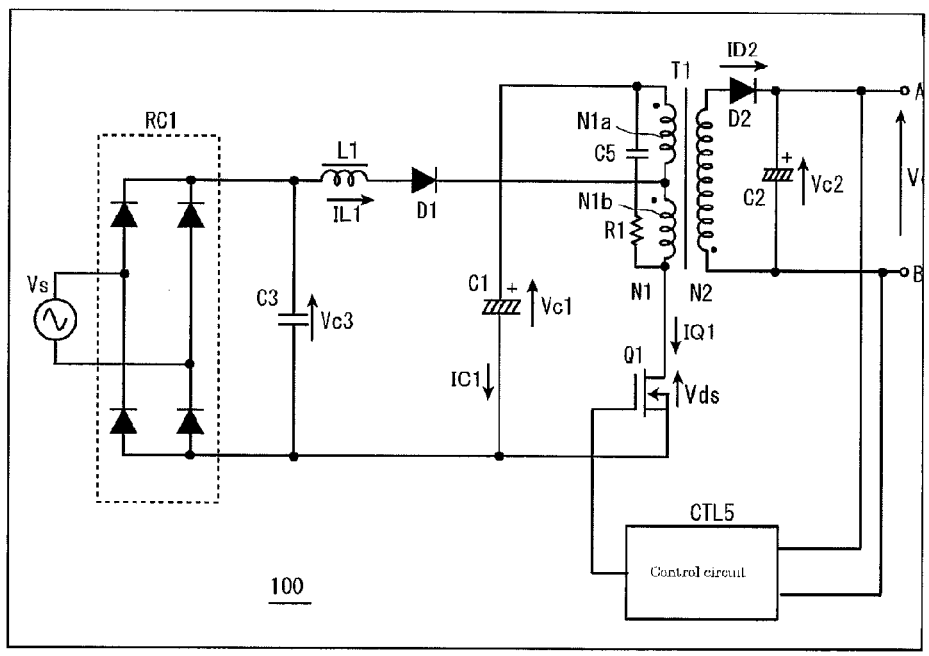
FIG. 7 is a diagram showing the circuit configuration of the direct-current power supply device 100 of a conventional technique.

FIG. 1 shows the circuit configuration of a direct-current power supply device 1 of the first embodiment of the present invention. The direct-current power supply device 1 is different from the direct-current power supply device 100 of the conventional technique shown in FIG. 7 in that a circuit (switching elements Q2 and Q3, and resistance R2) for supplying electric charge of a smoothing capacitor C1 to power supply Vcc of a control circuit CTL1 is provided, with the switching elements Q2 and Q3 controlled by an ON/OFF signal from the control circuit CTL1 at a time when a load is light. The switching elements Q2 and Q3 and the resistance R2 make up a circuit that also serves as a start-up circuit of a control circuit. Incidentally, an auxiliary winding N3 of a transformer T1, a diode D3, a smoothing capacitor C4 and the like are not shown in FIG. 7 but are shown in FIG. 1. The bypass capacitor C3, which is shown in FIG. 7 but not in FIG. 1, a high frequency component removing capacitor and a filter provided between a commercial alternating-current power supply Vs and a rectification circuit RC1, which are disclosed in Patent Document 1, or the like may be provided when needed.

The circuit configuration of the direct-current power supply device 1 will be described with reference to FIG. 1. A rectification circuit RC1 where diodes are so connected as to form a bridge is connected to a commercial alternating-current power supply Vs. To a positive electrode-side output terminal (voltage Vin) of the rectification circuit RC1, one terminal of a reactor L1 is connected. To the other terminal of the reactor L1, an anode terminal of a fast recovery diode D1 is connected. A cathode terminal of the fast recovery diode D1 is connected to a tap section of a primary winding N1 of the transformer T1. The primary winding N1 of the transformer T1 is made up of two windings N1a (first primary winding) and N1b (second primary winding). A connection point for the other terminal of the first primary winding N1a and one terminal (at the side indicated by ● in the diagram) of the second primary winding N1b is the tap section described above. One terminal (at the side indicated by ● in the diagram) of the first primary winding N1a is connected to one terminal (at the positive electrode side) of the smoothing capacitor C1. The other terminal (at the negative electrode side) of the smoothing capacitor C1 is connected to a negative electrode-side output terminal (GND) of the rectification circuit RC1. The other terminal of the second primary winding N1b is connected to a drain terminal of the switching element Q1. A source terminal of the switching element Q1 is connected to a connection point where the negative electrode-side output terminal of the rectification circuit RC1 and the other end of the smoothing capacitor C1 are connected. The voltage polarity of the primary winding of the transformer T1 is set as indicated by ● in the diagram.

The other end of a secondary winding N2 of the transformer T1 is connected to an anode terminal of the diode D2. A cathode terminal of the diode D2 is connected to one terminal (at the positive electrode side) of a smoothing capacitor C2. One terminal (at the side indicated by ● in the diagram) of the secondary winding N2 of the transformer T1 is connected to the other terminal (at the negative electrode side) of the smoothing capacitor C2. The voltage polarity of the transformer T1 is set as indicated by ● in the diagram so as to work as a flyback converter. One terminal and the other terminal of the smoothing capacitor C2 work as a positive electrode-side output terminal A and negative electrode-side output terminal B of the direct-current power supply device 1, respectively. The voltage between the positive electrode-side output terminal A and negative electrode-side output terminal B of the direct-current power supply device 1 is detected by an output voltage detection circuit DTC, which is connected between the positive electrode-side output terminal A and the negative electrode-side output terminal B. A resultant detection signal is input, as a feedback signal FB, to the control circuit CTL1. The control circuit CTL1 makes a comparison between a preset chopping-wave voltage and the feedback signal FB; a pulse signal for turning the switching element ON/OFF is output from an OUT terminal of the control circuit CTL1 to a gate terminal of the switching element Q1 so that output voltage Vo (=voltage VC2 of the smoothing capacitor C2) comes to a desired target voltage. Adjustments to the output voltage Vo can be made by changing the size of the feedback signal FB with the use of an output voltage control signal vc, which is input into the output voltage detection circuit DTC.

In the transformer T1, an auxiliary winding N3 is provided for power supply of the control circuit CTL1. The voltage of the auxiliary winding N3 is rectified and smoothed by a diode D3 and a smoothing capacitor C4 before being supplied as power supply Vcc of the control circuit CTL1. The voltage polarity of the primary winding N1 of the transformer T1 and of the auxiliary winding N3 is set as indicated by ● in the diagram.

What is provided for the smoothing capacitor C1 is a circuit (switching elements Q2 and Q3, and resistance R2) that also serves as a start-up circuit of the control circuit CTL1 and supplies electric charge of the smoothing capacitor C1 to the power supply Vcc of the control circuit CTL1 at a time when the load is light: the smoothing capacitor C1 is connected in parallel to the circuit. That is, to one terminal (at the positive electrode side) of the smoothing capacitor C1, a drain terminal of the switching element Q2 (FET, for example) is connected. A source terminal of the switching element Q2 is connected to a terminal of power supply Vcc of the control circuit CTL1. To a gate terminal of the switching element Q2, a drain terminal of the switching element Q3 is connected. A source terminal of the switching element Q3 is connected to GND. Resistance R2 is connected between the gate and drain of the switching element Q2. A gate terminal of the switching element Q3 is connected to an ON/OFF signal output terminal of the control circuit CTL1.

As the voltage of the power supply Vcc of the control circuit CTL1 decreases, the decrease is detected by the control circuit CTL1, which then outputs a signal for turning the switching element Q3 off from an ON/OFF signal output terminal of the control circuit CTL1. As a result, the switching element Q3 is turned off. Therefore, the switching element Q2 is turned on, supplying power from the smoothing capacitor C1 to the power supply Vcc of the control circuit CTL1. That is, when the output of the direct-current power supply device 1 turns into a light-load state or when the output voltage is lowered by the output voltage control signal vc, a period during which the switching element Q1 is ON is shortened. Accordingly, the average value of the voltage waveform that appears at the auxiliary winding N3 of the transformer T1 falls, resulting in a decrease in voltage of the power supply Vcc. After the decrease in voltage of the power supply Vcc is detected by the control circuit CTL1, a signal for turning the switching element Q3 off is output from the ON/OFF signal output terminal of the control circuit CTL1. As a result, the switching element Q3 is turned off. Therefore, the switching element Q2 is turned on, and the electric charge of the smoothing capacitor C1 is discharged. Thus, it is possible to lower the voltage of the smoothing capacitor C1.

Figure 2:
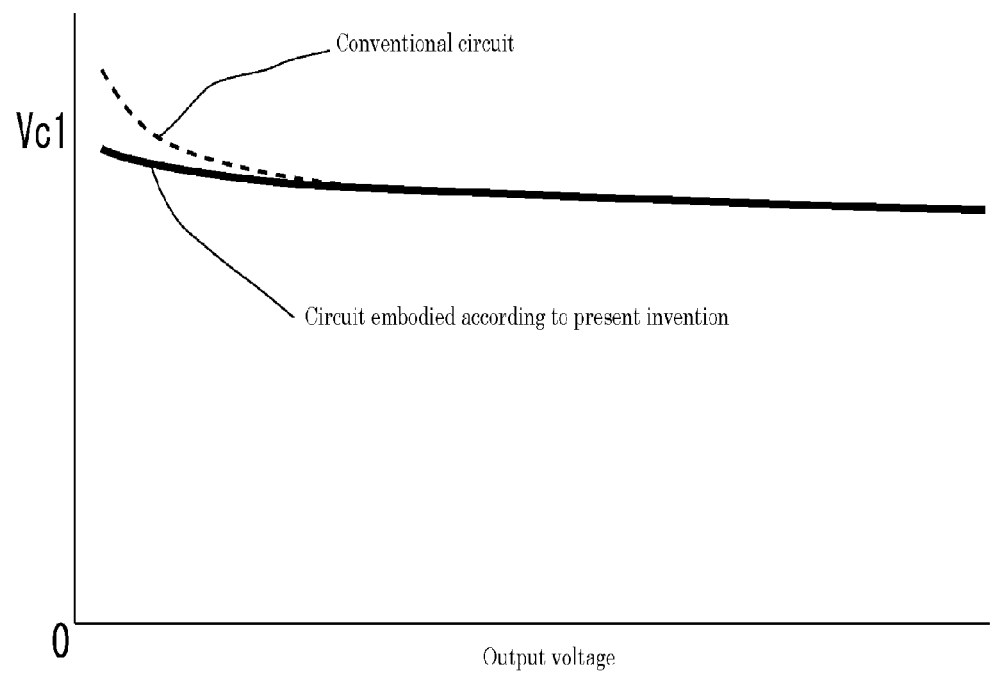
FIG. 2 is a diagram showing a voltage characteristic of a smoothing capacitor of the direct-current power supply device 1 according to first to fourth embodiments of the present invention.

FIG. 2 shows a characteristic, with the horizontal axis representing the output voltage (the state of the load) of the DC/DC converter and the vertical axis representing the terminal voltage of the smoothing capacitor of the PFC circuit. Among characteristic curves, the solid-line characteristic curve represents a characteristic of the direct-current power supply device 1 of the first embodiment of the present invention. The dotted-line characteristic curve represents a characteristic of the direct-current power supply device 100 made up of conventional circuits. It is clear that when compared with the conventional circuits, the terminal voltage of the smoothing capacitor C1 of the PFC circuit of the present invention is kept lower at a time when the load is light.

According to the present first embodiment, with the circuit that also serves as a start-up circuit, it is possible to curb an increase in voltage of the smoothing capacitor C1 at a time when the load is light. Therefore, the advantage is that the circuit configuration is simplified. Moreover, according to the present embodiment, part of the magnetic energy released from the reactor L1 can be used as power of the power supply of the control circuit CTL1. Therefore, compared with the one in which the energy generated by a rise in voltage of the smoothing capacitor C1 is simply consumed by resistance, it is possible to improve the efficiency of the direct-current power supply device. Since the voltage of the smoothing capacitor C1 falls, a capacitor with low voltage-withstanding capability can be used. Thus, it is possible to achieve a reduction in costs of smoothing capacitors and an improvement in reliability. If the power supply Vcc of the control circuit CTL1 is obtained by rectifying the voltage of the auxiliary winding N3 of the transformer T1, the power supply Vcc decreases when the output of the direct-current power supply device 1 turns into a light-load state or when the output voltage is lowered by the output voltage control signal vc. However, according to the present first embodiment, power is supplied from the smoothing capacitor C1. Therefore, it is possible to keep the power supply Vcc of the control circuit CTL1 from decreasing.

(Second Embodiment)

FIG. 3 shows the circuit configuration of the direct-current power supply device 2 of the second embodiment of the present invention. The direct-current power supply device 2 is different from the direct-current power supply device 1 of the first embodiment shown in FIG. 1: while the drain terminal of the switching element Q2 is connected to one terminal (positive-electrode terminal) of the smoothing capacitor C1 in the direct-current power supply device 1, the drain terminal of the switching element Q2 is connected to a connection point where the other terminal of the second primary winding N1b of the transformer T1 and the drain terminal of the switching element Q1 are connected together in the direct-current power supply device 2. The configuration of the other parts is the same as that of the first embodiment and therefore will not be described in detail.

According to the present second embodiment, unlike the first embodiment, the energy accumulated in the smoothing capacitor C1 is not supplied to the power supply Vcc of the control circuit CTL1; part of the electromagnetic energy released from the reactor L1 is supplied to the power supply Vcc of a control circuit CTL2 via the second primary winding N1b of the transformer T1. As in the case of the first embodiment, even in the present second embodiment, when the voltage of the power supply Vcc of the control circuit CTL2 decreases, the decrease is detected by the control circuit CTL2. A signal for turning the switching element Q3 off is output from the ON/OFF signal output terminal of the control circuit CTL2, and the switching element Q3 is turned off. As a result, the switching element Q2 is turned on, supplying power from the smoothing capacitor C1 to the power supply Vcc of the control circuit CTL2.

That is, when the output of the direct-current power supply device 2 turns into a light-load state or when the output voltage is lowered by the output voltage control signal vc, a period during which the switching element Q1 is ON is shortened. Accordingly, the average value of the voltage waveform that appears at the auxiliary winding N3 of the transformer T1 falls, resulting in a decrease in voltage of the power supply Vcc. After the decrease in voltage of the power supply Vcc is detected by the control circuit CTL2, a signal for turning the switching element Q3 off is output from the ON/OFF signal output terminal of the control circuit CTL2. As a result, the switching element Q3 is turned off. Therefore, the switching element Q2 is turned on, and part of the magnetic energy released from the reactor L1 is consumed as power supply of the control circuit CTL2. Thus, it is possible to lower the voltage of the smoothing capacitor C1. Even in the present second embodiment, the circuit also serves as a start-up circuit. Moreover, it is possible to curb an increase in voltage of the smoothing capacitor C1 at a time when the load is light, and the advantage is that the circuit configuration is simplified. Moreover, even in the present second embodiment, part of the magnetic energy released from the reactor L1 can be used as power of the power supply of the control circuit CTL2. Therefore, compared with the one in which the energy generated by a rise in voltage of the smoothing capacitor C1 is simply consumed by resistance, it is possible to improve the efficiency of the direct-current power supply device 2. Moreover, since the voltage of the smoothing capacitor C1 falls, a capacitor with low voltage-withstanding capability can be used. Thus, it is possible to achieve a reduction in costs of smoothing capacitors and an improvement in reliability. If the power supply Vcc of the control circuit CTL2 is obtained by rectifying the voltage of the auxiliary winding N3 of the transformer T1, the power supply Vcc decreases when the output of the direct-current power supply device 2 turns into a light-load state or when the output voltage is lowered by the output voltage control signal vc. However, according to the present second embodiment, power is supplied from the reactor L1. Therefore, it is possible to keep the power supply Vcc of the control circuit CTL2 from decreasing.

(Third Embodiment)

FIG. 4 shows the circuit configuration of the direct-current power supply device 3 of the third embodiment of the present invention. In the direct-current power supply device 3, the switching elements Q2 and Q3 and resistance R2, which the direct-current power supply devices of the first and second embodiments include, are removed. Instead of the reactor L1, a reactor L2 including a main winding P and an auxiliary winding S is provided. The main winding P is used in the same way as the reactor L1 of the first or second embodiment. Part of the magnetic energy of the reactor L2 is supplied to the power supply Vcc of a control circuit CTL3 from the auxiliary winding S via a diode D4 at a time when the load is light. The configuration of the other parts is the same as that of the first or second embodiment and therefore will not be described in detail.

When the load is heavy, as in the case of a circuit of a conventional technique, the power supply Vcc of the control circuit CTL3 is supplied from the auxiliary winding N3 of the transformer T1. However, when the output turns into a light-load state or when the output voltage Vo is lowered by the output voltage control signal vc, a period during which the switching element Q1 is ON is shortened. Accordingly, the average value of the voltage waveform that appears at the auxiliary winding N3 of the transformer T1 falls, and part of the magnetic energy of the reactor L2 is supplied to the power supply Vcc of the control circuit CTL3 from the auxiliary winding S via the diode D4. Therefore, part of the magnetic energy, which is accumulated in the reactor L2 when the switching element Q1 is turned on, is supplied to the power supply of the control circuit CTL3; the electric charge that is supplied to the smoothing capacitor C1 decreases. Thus, it is possible to lower the voltage of the smoothing capacitor C1. According to the present third embodiment, the switching elements Q2 and Q3 are unnecessary; a portion of the control circuit for the switching elements Q2 and Q3 is also unnecessary. Thus, the advantage is that the circuit configuration is simplified. Moreover, since the voltage of the smoothing capacitor C1 falls, a capacitor with low voltage-withstanding capability can be used. Thus, it is possible to achieve a reduction in costs of smoothing capacitors and an improvement in reliability. If the power supply Vcc of the control circuit CTL3 is obtained by rectifying the voltage of the auxiliary winding N3 of the transformer T1, the power supply Vcc decreases when the output of the direct-current power supply device 3 turns into a light-load state or when the output voltage is lowered by the output voltage control signal vc. However, according to the present third embodiment, power is supplied from the auxiliary winding S of the reactor L2. Therefore, it is possible to keep the power supply Vcc of the control circuit CTL3 from decreasing.

(Fourth Embodiment)

FIG. 5 shows the circuit configuration of the direct-current power supply device 4 of the fourth embodiment of the present invention. The direct-current power supply device 4 is substantially the same as the direct-current power supply device 100 of the conventional technique shown in FIG. 7. However, the direct-current power supply device 4 is different from the direct-current power supply device 100 in that the output voltage Vo is controlled so as to be lowered by the output voltage control signal vc at a time when the load is light. In this case, the output voltage can be decreased when the output voltage detection circuit DTC increases the detection voltage relative to the same output voltage and outputs a feedback signal FB to a control circuit CTL4. When the target output voltage of the output voltage Vo is lowered, the voltage of the stray capacitance (or the capacitor C5 of the snubber circuit) between the windings of the transformer T1 is being charged after the start of a switching operation of the switching element Q1. A period of time (the period of time t0 to t8 shown in FIG. 8, or the period of time t16 to t17) required for the voltage occurring at the secondary winding N2 to rise to voltage VC2 where the smoothing capacitor C2 can be charged is shortened, thereby curbing an increase in voltage of the smoothing capacitor. According to the present fourth embodiment, the switching elements Q2 and Q3 are unnecessary; a portion of the control circuit for the switching elements Q2 and Q3 is also unnecessary. Thus, the advantage is that the circuit configuration is simplified. Moreover, since the voltage of the smoothing capacitor C1 falls, a capacitor with low voltage-withstanding capability can be used. Thus, it is possible to achieve a reduction in costs of smoothing capacitors and an improvement in reliability.

The above has described the present invention through specific examples. However, the above description is given for illustrative purposes only. Needless to say, the present invention may be modified and embodied without departing from the scope of the present invention. For example, according to the present embodiment, to the direct-current power supply device shown in FIG. 1 of the specification of Patent Document 1, the present invention is applied. However, the present invention is not limited to the above. The present invention may be applied in a way that curbs an increase in voltage of a smoothing capacitor Cdc (equivalent to the smoothing capacitor C1 of the embodiments of the present invention) shown in FIGS. 5 to 11 of the specification of Patent Document 1. Moreover, in the examples described above, a MOSFET is used for the switching element Q1. However, a bipolar transistor, FET, IGBT or any other transistor can also be used. Moreover, in the examples described above, FETs are used for the switching elements Q2 and Q3. However, bipolar transistors or MOSFETs can also be used.

What is claimed is:

1. A direct-current power supply device that converts energy obtained from an alternating-current power supply into direct-current energy, the device comprising:
    a rectifier that converts alternating-current voltage of the alternating-current power supply into direct-current voltage;
    a transformer that includes a primary winding, which includes a tap at a connection point where a first primary winding and a second primary winding are connected, and a secondary winding;
    a primary-side smoothing capacitor whose positive electrode-side terminal is connected to a terminal at a side opposite to the tap of the first primary winding and whose negative electrode-side terminal is connected to a negative electrode-side output terminal of the rectifier;
    a first switching element whose drain and source terminals are connected between the negative electrode-side output terminal of the rectifier and a terminal at a side opposite to the tap of the second primary winding;
    a reactor and backflow preventing diode that are connected in series between a positive electrode-side output terminal of the rectifier and the tap of the transformer;
    a direct-current smoothing circuit that includes a rectifying diode, which is connected to the secondary winding of the transformer, and a secondary-side smoothing capacitor; and
    discharging means for detecting a light-load state of an output and discharging electric charge of the primary-side smoothing capacitor in a way that suppresses an increase in voltage of the primary-side smoothing capacitor.

2. The direct-current power supply device according to claim 1, wherein
    the discharging means is so formed that the electric charge of the primary-side smoothing capacitor is supplied to power supply of a control circuit that performs ON/OFF control of the first switching element.

3. The direct-current power supply device according to claim 2, wherein
    the discharging means includes:
    a second switching element whose drain and source terminals are connected between a power supply terminal of the control circuit and a connection point where the first primary winding and the positive electrode-side terminal of the primary-side smoothing capacitor are connected;

resistance that is connected between drain and gate terminals of the second switching element;

a third switching element whose drain and source terminals are connected between the gate terminal of the second switching element and the negative electrode-side output terminal of the rectifier; and a control circuit that outputs an ON/OFF signal to a gate terminal of the third switching element, wherein the control circuit is so formed as to detect a decrease in power supply voltage of the control circuit and output, when the decrease in power supply voltage is detected, an OFF signal to the third switching element.

4. A direct-current power supply device that converts energy obtained from an alternating-current power supply into direct-current energy, the device comprising:

a rectifier that converts alternating-current voltage of the alternating-current power supply into direct-current voltage;

a transformer that includes a primary winding, which includes a tap at a connection point where a first primary winding and a second primary winding are connected, and a secondary winding;

a primary-side smoothing capacitor whose positive electrode-side terminal is connected to a terminal at a side opposite to the tap of the first primary winding and whose negative electrode-side terminal is connected to a negative electrode-side output terminal of the rectifier;

a first switching element whose drain and source terminals are connected between the negative electrode-side output terminal of the rectifier and a terminal at a side opposite to the tap of the second primary winding;

a reactor and backflow preventing diode that are connected in series between a positive electrode-side output terminal of the rectifier and the tap of the transformer;

a direct-current smoothing circuit that includes a rectifying diode, which is connected to the secondary winding of the transformer, and a secondary-side smoothing capacitor; and electromagnetic energy supplying means for detecting a light-load state of an output and supplying part of electromagnetic energy of the reactor to a power supply of a control circuit, which performs ON/OFF control of the first switching element, via the second primary winding.

5. The direct-current power supply device according to claim 4, wherein the electromagnetic energy supplying means includes:

a second switching element whose drain and source terminals are connected between a power supply terminal of the control circuit and a connection point where the second primary winding and the drain terminal of the first switching element are connected;

resistance that is connected between drain and gate terminals of the second switching element;

a third switching element whose drain and source terminals are connected between the gate terminal of the second switching element and the negative electrode-side output terminal of the rectifier; and a control circuit that outputs an ON/OFF signal to a gate terminal of the third switching element, wherein the control circuit is so formed as to detect a decrease in power supply voltage of the control circuit and output, when the decrease in power supply voltage is detected, an OFF signal to the third switching element.

6. A direct-current power supply device that converts energy obtained from an alternating-current power supply into direct-current energy, the device comprising:

a rectifier that converts alternating-current voltage of the alternating-current power supply into direct-current voltage;

a transformer that includes a primary winding, which includes a tap at a connection point where a first primary winding and a second primary winding are connected, and a secondary winding;

a primary-side smoothing capacitor whose positive electrode-side terminal is connected to a terminal at a side opposite to the tap of the first primary winding and whose negative electrode-side terminal is connected to a negative electrode-side output terminal of the rectifier;

a first switching element whose drain and source terminals are connected between the negative electrode-side output terminal of the rectifier and a terminal at a side opposite to the tap of the second primary winding;

a reactor and backflow preventing diode that are connected in series between a positive electrode-side output terminal of the rectifier and the tap of the transformer;

a direct-current smoothing circuit that includes a rectifying diode, which is connected to the secondary winding of the transformer, and a secondary-side smoothing capacitor; and electromagnetic energy supplying means for supplying part of electromagnetic energy of the reactor to a power supply of a control circuit, which performs ON/OFF control of the first switching element, via a diode using an auxiliary winding provided in the reactor.

7. The direct-current power supply device according to claim 6, wherein the electromagnetic energy supplying means is so formed that:

the auxiliary winding of the reactor and the diode are connected in series between the negative electrode-side output terminal of the rectifier and the power supply of the control circuit; and current flows from the auxiliary winding to the power supply of the control circuit via the diode as the power supply voltage of the control circuit decreases.

8. A direct-current power supply device that converts energy obtained from an alternating-current power supply into direct-current energy, the device comprising:

a rectifier that converts alternating-current voltage of the alternating-current power supply into direct-current voltage;

a transformer that includes a primary winding, which includes a tap at a connection point where a first primary winding and a second primary winding are connected, and a secondary winding;

a primary-side smoothing capacitor whose positive electrode-side terminal is connected to a terminal at a side opposite to the tap of the first primary winding and whose negative electrode-side terminal is connected to a negative electrode-side output terminal of the rectifier;

a first switching element whose drain and source terminals are connected between the negative electrode-side output terminal of the rectifier and a terminal at a side opposite to the tap of the second primary winding;

a reactor and backflow preventing diode that are connected in series between a positive electrode-side output terminal of the rectifier and the tap of the transformer;

a direct-current smoothing circuit that includes a rectifying diode, which is connected to the secondary winding of the transformer, and a secondary-side smoothing capacitor;

a control circuit that outputs an ON/OFF signal to the first switching element to control output voltage so that the output voltage becomes predetermined voltage; and an output voltage detection circuit that increases detection voltage relative to the same output voltage and outputs a feedback signal to the control circuit at a time when a load is light, wherein an operation taking place in a way that lowers the output voltage when the load is light.

\* \* \* \* \*